US010970530B1

(12) United States Patent
Adam et al.

(10) Patent No.: US 10,970,530 B1
(45) Date of Patent: Apr. 6, 2021

(54) GRAMMAR-BASED AUTOMATED GENERATION OF ANNOTATED SYNTHETIC FORM TRAINING DATA FOR MACHINE LEARNING

(71) Applicant: Amazon Technologies, Inc., Seattle, WA (US)

(72) Inventors: Amit Adam, Haifa (IL); Oron Anschel, Haifa (IL); Or Perel, Tel Aviv (IL); Gal Sabina Star, Haifa (IL); Omri Ben-Eliezer, Ramat Gan (IL); Hadar Averbuch Elor, Ra'anana (IL); Shai Mazor, Binyamina (IL); Wendy Tse, Seattle, WA (US); Andrea Olgiati, Gilroy, CA (US); Rahul Bhotika, Bellevue, WA (US); Stefano Soatto, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 52 days.

(21) Appl. No.: 16/189,633

(22) Filed: Nov. 13, 2018

(51) Int. Cl.
*G06K 9/62* (2006.01)
*G06F 40/137* (2020.01)
*G06F 40/169* (2020.01)
*G06F 40/174* (2020.01)
*G06K 9/00* (2006.01)
*G06N 20/00* (2019.01)

(52) U.S. Cl.
CPC ....... *G06K 9/00449* (2013.01); *G06F 40/137* (2020.01); *G06F 40/169* (2020.01); *G06F 40/174* (2020.01); *G06K 9/00469* (2013.01); *G06K 9/6257* (2013.01); *G06N 20/00* (2019.01)

(58) Field of Classification Search
CPC combination set(s) only.
See application file for complete search history.

(56) References Cited

U.S. PATENT DOCUMENTS

| 2006/0190489 A1* | 8/2006 | Vohariwatt | G06Q 10/00 |
| 2006/0245641 A1* | 11/2006 | Viola | G06F 40/295 |
| | | | 382/155 |
| 2014/0075004 A1* | 3/2014 | Van Dusen | G06F 16/90335 |
| | | | 709/223 |
| 2014/0201126 A1* | 7/2014 | Zadeh | A61B 5/165 |
| | | | 706/52 |
| 2014/0222349 A1* | 8/2014 | Higgins | G16B 20/00 |
| | | | 702/19 |

(Continued)

OTHER PUBLICATIONS

Mun Wai Lee,"A framework for semantic annotation of visual events",May 7, 2008,2008 IEEE Computer Society Conference on Computer Vision and Pattern Recognition Workshops,pp. 1-7.*

(Continued)

*Primary Examiner* — Omar S Ismail
(74) *Attorney, Agent, or Firm* — Nicholson De Vos Webster & Elliott, LLP

(57) ABSTRACT

Techniques for grammar-based automated generation of annotated synthetic form training data for machine learning are described. A training data generation engine utilizes a defined grammar to construct a layout for a form, select key-value units to place within the layout, and select attribute variants for the key-value units. The form is rendered and stored at a storage location, where it can be provided along with other similarly-generated forms to be used as training data for a machine learning model.

20 Claims, 9 Drawing Sheets

(56) References Cited

U.S. PATENT DOCUMENTS

| | | | | |
|---|---|---|---|---|
| 2014/0223284 A1* | 8/2014 | Rankin, Jr. | ............ | G06F 40/186 |
| | | | | 715/234 |
| 2014/0245122 A1* | 8/2014 | Oro | ......................... | G06F 40/30 |
| | | | | 715/230 |
| 2016/0078366 A1* | 3/2016 | Kaplan | .................. | G06N 5/022 |
| | | | | 706/12 |
| 2016/0255139 A1* | 9/2016 | Rathod | ................. | H04L 51/046 |
| | | | | 709/203 |
| 2016/0283936 A1* | 9/2016 | Daniel | .................... | G06Q 50/01 |
| 2018/0204111 A1* | 7/2018 | Zadeh | .................. | G06K 9/3233 |
| 2018/0276278 A1* | 9/2018 | Cagan | .................. | G06F 16/367 |
| 2019/0278844 A1* | 9/2019 | Brixey | ................. | G06F 3/04842 |

OTHER PUBLICATIONS

Normunds Gruzitis,"Rigotrio at SemEval-2017 Task 9: Combining Machine Learning and Grammar Engineering for AMR Parsing and Generation",Proceedings of the 11th International Workshop on Semantic Evaluations (SemEval-2017), pp. 924-928.*
Franco Mascia,"Grammar-based generation of stochastic local search heuristics through automatic algorithm configuration tools", Computers & Operations Research,51 (2014),pp. 190-197.*

* cited by examiner

EXPANSION 404            PORTION 402

Void:                              49367.68 a Employee's social security number:         720-5472 b Employer identification number (EIN):      10-965-60919 c Employer's name, address, and ZIP code:     QZMQKAB KRIQ GGVSIA DFCUB 47397 e Employee's first name and initial:        EZSCYM AA FHYO ACSWMG

Last name:      QVYXQ QMNJXC RVRYFZ FHML

Suff.:    WSB H2LGOSG f Employee's address and ZIP code:         QJBWWE KSIC ACQEL OEFD 52738

1 Wages, tips, other compensation:     1961.71          11 Nonqualified plans

2 Federal income tax withheld:     8940.88          Q HDRG TABR K

3 Social security wages:     31034.46          12a See instructions for box 12

35315.0

5 Medicare wages and tips:     23970.07

12b

7 Social security tips:     49267.73

10 Dependent care benefits     8 Allocated tips     LEU ABAUB

13d 31048.33      17027.68      27751.99

18 Local wages, tips, etc.:     23034.61     14 Other:     36247.98

*FIG. 4*

GRAMMAR-BASED AUTOMATED GENERATION OF ANNOTATED SYNTHETIC FORM TRAINING DATA FOR MACHINE LEARNING

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with. For example, a substantial amount of high-quality labeled training data is often required to sufficiently train a model, which is very difficult to obtain.

BRIEF DESCRIPTION OF DRAWINGS

Various embodiments in accordance with the present disclosure will be described with reference to the drawings, in which:

FIG. 4 is a diagram illustrating another exemplary annotated synthetic form according to some embodiments.

DETAILED DESCRIPTION

Various embodiments of methods, apparatus, systems, and non-transitory computer-readable storage media for the grammar-based automated generation of annotated synthetic form training data are described. According to some embodiments, a training data generation engine can generate large amounts of different annotated forms (e.g., images including visual representations of form documents) without human-generated annotations. The training data generation engine generates a layout of a form according to a grammar, and places key-value units with sampled attributes within the layout. The annotated forms can be used to easily train machine learning (ML) models, e.g., to enable them to detect keys and values within other forms.

In machine learning, having a sufficient amount of real-world annotated data is one the key factors needed for successfully training a model. For example, if there is a need to train a model to detect an animal within a such as a cat or horse in an image, someone needs to label the image with identifiers of cat or horse, typically along with location information identifying where in the image that particular animal is. This labeling is done be people referred to as annotators, who manually label images or other types of data to be used for training models. However, such human annotations of data (e.g., identifying and transcribing text, along with associated location information, for each of a very large number of data elements) takes a long time and is extremely prone to errors, resulting in a long process for generating a model, only to generate a model of poor quality due to being trained on erroneous or low-quality annotated data.

To implement a document or form processing service, numerous types of ML models may be utilized to analyze digital documents. For example, a ML model may be employed to seek to identify where text is represented an image of a document, and extract/identify what that text is. Thus, to train such a model, an extremely large amount of training data in the form of annotated images of documents needs to be generated, which is tremendously cumbersome for humans to perform as indicated above.

Embodiments disclosed herein can generate annotated synthetic documents (e.g., forms) to be used as training data via a grammar in an automated manner, which can be used as particularly high-quality data for training a ML model. Accordingly, machine learning models can be generated much faster, with potentially much larger amount of training data than before, resulting in improved performance of these models.

Figure 1:
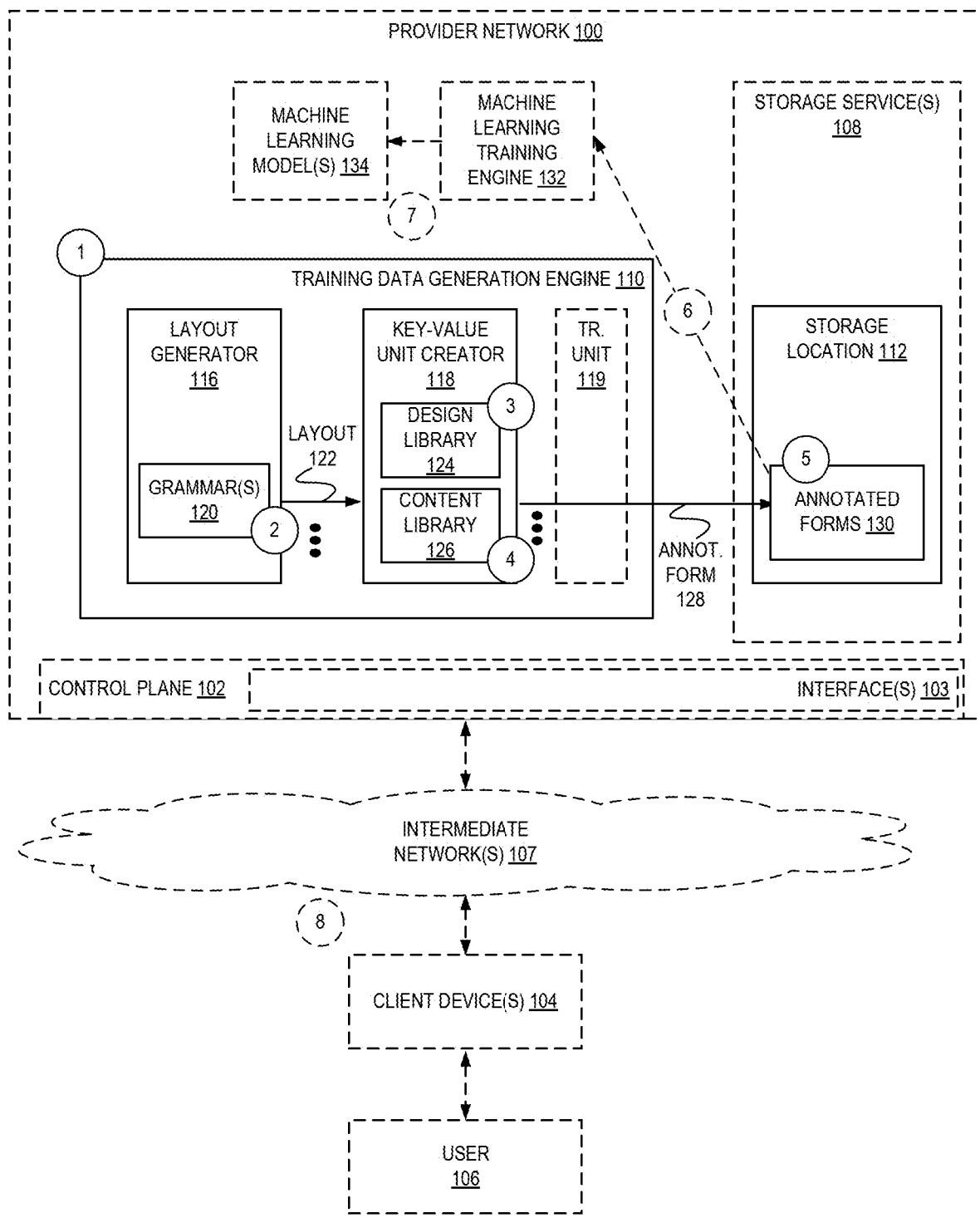
FIG. 1 is a diagram illustrating an environment for grammar-based automated generation of annotated synthetic form training data for machine learning according to some embodiments.

FIG. 1 is a diagram illustrating an environment for grammar-based automated generation of annotated synthetic form training data for machine learning according to some embodiments.

This environment includes a training data generation engine 110 that automatically generates annotated documents (e.g., forms). The training data generation engine 110 is primarily implemented using software, though in other embodiments it could be implemented in hardware or a combination of both hardware and software. In many embodiments, such as when the training data generation engine 110 is implemented as a component or service within a provider network 100 and needs to operate in large scale to process substantial numbers of requests, the training data generation engine 110 may be implemented in a distributed manner—e.g., using multiple computing devices in a same or different geographic location.

A provider network 100 provides users 106 with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users 106 (or "customers") of provider networks 100 may utilize one or more user accounts that are associated with a customer account, though these terms may be used somewhat interchangeably depending upon the context of use. Users may interact with a provider network 100 across one or more intermediate networks 107 (e.g., the internet) via one or more interface(s) 103, such as through use of application programming interface (API) calls, via a console implemented as a website or application, etc. The interface(s) 103 may be part of, or serve as a front-end to, a control plane 102 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user 106 may use a client device 104 to "directly" utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, the training data generation engine 110 in some embodiments is implemented in software and includes a number of sub-components that may also be implemented in whole or in part using software—a layout generator 116 and a key-value unit creator 118 (including a design library 124 and a content library 126).

An important insight is that forms used in various industries and settings around the world are easy for humans to understand in terms of identifying where "keys" are located and where "values" are located. Most general forms thus have what may be referred to as a set of (key, value) pairs. A value may typically be a string or a number, although other types and variations, such as "checkbox is marked", a signature, or structured strings such as addresses, are possible. The key is often a string of text (e.g., "SSN" for social security number, "First Name", etc.) near the location of the value. Thus, forms in general have a universally accepted style, which is quite limited as a consequence of the fact that forms (and documents in general) are there to serve a function. However, the design of forms is not standardized, and "on top" of a common overall format there are many specific attributes of a form that differ—e.g., font, font size, font weight, spacing, line widths, line types, etc.

Embodiments can exploit this universal overall format with form-specific attribute differences to automatically generate annotated data that can be used for training that is effectively from a same distribution as the test data—as forms aren't completely standardized, synthesized forms provide substantial value.

Thus, at circle (1), the training data generation engine 110 may be invoked to begin a "run" of generating one or more annotated documents. The invocation may comprise a request from a client device 104 of a user 106, another application (e.g., within or outside of the provider network 100), according to a schedule, etc. The invocation (e.g., message) may have an indicator value that indicates a "type" of documents/forms to be generated—e.g., a particular type of governmental form, a type of financial form, a type of commercial form, a type of medical form, etc. This can lead to the generation of forms having formats similar to what is needed for a particular user—e.g., having similar types of keys and values (e.g., biographical information of a person, financial information of a company, etc.).

The invocation may also include or reference a configuration for the "run" of form generation. For example, the configuration may indicate values such as an output storage location 112 where the annotated forms 130 are to be stored, a requested number of forms to generate (e.g., 50,000), a type of the annotated forms 130 (e.g., an image in PNG format, along with JSON/XML within a text file providing the annotations), a size of the annotated forms 130, a maximum, minimum, or exact number of different key-value units to be placed in the form (to be discussed herein), different attribute types (and optionally probabilities of which to select particular types) such as line widths (e.g., 1, 2, or 3), line styles (e.g., solid, dashed, dotted), line colors (e.g., black, gray, dark gray), fill colors (and optionally a probability of which to fill the background of a key-value unit), where/how to obtain keys and/or values, locations of keys (e.g., top left, bottom left) within a key-value unit, key fonts, key font size, value fonts, value font size, etc.

Ones (or all) of the following circles (2)-(5) may now be run one time (to generate one annotated form) or likely many times (to generate many annotated forms). For example, these operations may be performed a number of times specified by the configuration provided at time of invocation.

Thus, at circle (2) the layout generator 116 may obtain a grammar 120 to be used to generate a layout 122. The grammar 120 may specify particular rules for how a form is to be laid out—e.g., a number of sections/portions, what types of key-value units are to be placed in each of these sections/portions, etc. The grammar 120 may employ aspects of context free grammars and/or stochastic grammars as known to those of skill in the art.

As one example, a portion of a grammar 120 (shown as pseudocode) may be defined as follows in TABLE 1.

TABLE 1

Example Grammar Portion

```
# current_section is a person's "details" section that was just localized
IF 'address' IN section_types_to_populate:
    relative_position = decide_position('address', current_section)
    # decide_position returns either "right" or "below" as it sees that an
address is required near the current_section
    IF relative_position == 'right':
        allocate_space(min_size('address'), current_section.right_limit)
    ELSE:
        allocate_space(min_size('address'), current_section.bottom_limit)
```

In this example shown in TABLE 1, the portion of a grammar 120 may be used for a type of form involving people that includes a section with the personal details of the person. We Prior to the example section of pseudocode, we assume that the grammar indicated that a "personal details" section is created in the form. This section may include, for example, a person's name, date of birth (DOB), social security number (SSN), nation of origin or citizenship, etc. Thereafter, at the beginning of the exemplary grammar portion, a rule is configured to determine whether an "address" section exists. If the address section does not exist, there is nothing to do, so the processing of the grammar continues on. However, if the address section does exist (as shown by an "address" entry being within a "section_types_to_populate" data structure), the grammar instructs to place the section either immediately below or immediately to the right of the personal details section. Thus, this grammar portion indicates that the address section will not come before the personal details and will not come after but instead be separated from the personal details section.

The grammar 120 to be used may be selected from a library of grammars based on the "type" of documents/forms to be generated as specified at invocation-time. For example, one grammar 120 may exist for "governmental forms," and thus it may be selected when that form type is selected at invocation. However, in some embodiments, there may be multiple different grammars 120 for a same "type" of form—thus, these different grammars 120 may be sampled randomly for each form, according to a defined distribution, etc.

Using the obtained grammar 120, the layout generator 116 creates a layout 122 indicating where particular key-value units are to be placed in a form. Notably, this layout 122 is generated based on randomized selection of various aspects (or "sampling") so that for a same grammar 120 it is extremely likely that two forms generated therefrom will be substantially different.

In some embodiments the grammar 120 is hierarchical in structure so that multiple levels of layout generation are performed. For example, a "top" level of the grammar 120 may indicate that a first section of the document is to be between twenty and fifty percent of the overall form, a second section of the document is to be between twenty and forty percent of the overall form, and a third section of the document is to be between five and twenty percent of the form. Thus, the layout generator 116 may first select sizes for each of these sections according to a random selection of these values (e.g., based on generating random values as is known to those of skill in the art). Alternatively, the grammar 120 may not specify particular sizes of the sections or may specify fixed sizes for the sections.

A next level of the grammar may specify rules indicating what types of components exist within each of the document sections. Each component may be another section of the document, a key-value unit, or an abstracted "grouping" of multiple key-value units (or further groupings) that can subsequently be deconstructed at a "next" level of the hierarchy. For example, the rules for the first section of the form may cause this portion to be a "biographical" section of the form, and thus require a first name, a last name (optionally placed adjacently to each other according to a rule), an address (which may be further broken down in a next level into a house number, street name, city, state, ZIP code, country, etc.), a social security number or other government identifier (ID) value, a birthday, a place of birth, etc. In some embodiments, this level indicates one or more key-value units (or components) that must be included in the document section, though in other embodiments this level indicates one or more key-value units (or components) that are eligible for inclusion, though necessarily do not need to be included.

Continuing the example, the second section may specify a number of key-value units (e.g., tables, boxes, etc.) to include general form data, while the third section may include a single key-value unit to hold "form instructions" type text describing how to fill out the form, or include footnotes, etc.

In some embodiments, the layout 122 may be generated so that a number of key-value units within each section encompass the entire section or as much area as possible of the section. This can include, as a few examples, re-orienting the placement of the particular key-value units, resizing particular key-value units (e.g., stretching out a box horizontally), etc.

Accordingly, by stepping through this hierarchy, and expanding "grouped" components if/when they exist, the layout generator 116 can generate a layout 122 describing where in the form particular key-value units are to be placed, and optionally a "type" of one or more of the key-value units. This layout 122 can be provided to the key-value unit creator 118, e.g., via a function invocation, a web service (or microservice) request message, by placing the layout 122 in a work queue, etc.

A key-value unit may generally refer to an area of a form that includes zero or more keys and one or more values. For example, in many embodiments most (or all) key-value units include one key and one value. A key-value unit may specify a particular "type" of the input element—e.g., a checkbox with labels, a box for text entry having a key inside the box at a corner of the box, etc.

The key-value unit creator 118 may then construct a form with annotations 128 based on the layout 122 and introduce additional variance through sampling/randomization techniques. For example, the key-value unit creator 118 may use probabilities expressed in the configuration to select particular attributes (e.g., generate one or more random values and use the probabilities to select a dashed border for a key-value unit, select a line width of "2" for the border, etc.)

At circle (3), the key-value unit creator 118 may utilize a design library 124 including graphical elements (or instructions/code/designs indicating how to construct particular graphical elements) to construct the key-value elements according to the determined attributes. For example, the design library 124 may allow the key-value unit creator 118 to construct a checkbox at a particular location, a line or box of a particular size, color, type, etc.

At circle (4), the key-value unit creator 118 may utilize a content library 126 to select data for the keys and/or values of the key-value units. For example, the content library 126 may comprise a dictionary of values that can be looked up and used as keys or values—e.g., for a "first name" kay-value unit, the dictionary may include one or multiple first names (to be sampled from) that could be inserted as a value, and/or may include one or multiple headings (to be sampled from, such as "first" or "first name" or "(First)") that could be inserted as a key. The content library 126 may also provide a formula indicating how to generate a particular key or value (e.g., create a string of length 5-20 including only alphanumeric characters, etc.).

Thus, due to circles (3) and (4), the key-value unit creator 118 can generate variants of key-value units (specified by the layout 122) with key and value variants, and place these within the form at locations specified by the layout 122 to thus yield the annotated form 128 (with annotations based on the layout 122 indicating where the keys and corresponding values are located), which at circle (5) may be stored at a storage location 112 (e.g., of a storage service 108 of a provider network 100). As indicated above, this set of operations may be performed multiple times to generate multiple different high-quality annotated forms 130 without human intervention (i.e., human annotations). Although these forms 130 may potentially appear somewhat strange to humans, they beneficially provide an extremely useful representation that can be used to impart "knowledge" into machine learning models 134 trained using it.

In some embodiments, the annotated forms 128 may optionally be "transformed" using one or multiple image transformations (known to those of skill in the art) to generate modified variants of the annotated forms 128. Thus, one or more transformations may be applied to the annotated forms 128 to, for example, rotate the forms, adjust the color and/or contrast of the forms, simulate "wrinkles" in the forms, introduce watermarks or defects (such as liquid stains, fingerprints, ink smudges, tec.), enlarge or shrink the forms, etc. Accordingly, more "lifelike" forms can be generated to further improve the ultimate machine learning model(s) 134 trained therefrom to operate on "real-world" form data that may have similar transforms.

Thus, optionally the annotated forms 130 may be provided to a machine learning training engine 132 at circle (6), which may use the annotated forms 130 to train one or more machine learning models 134 at circle (7) to, by way of example, infer where there are particular keys and particular values in a "new" form (e.g., provided in a request by a client device 104 at optional circle (8)), infer where corresponding keys and values are in a new form, etc.

Figure 2:
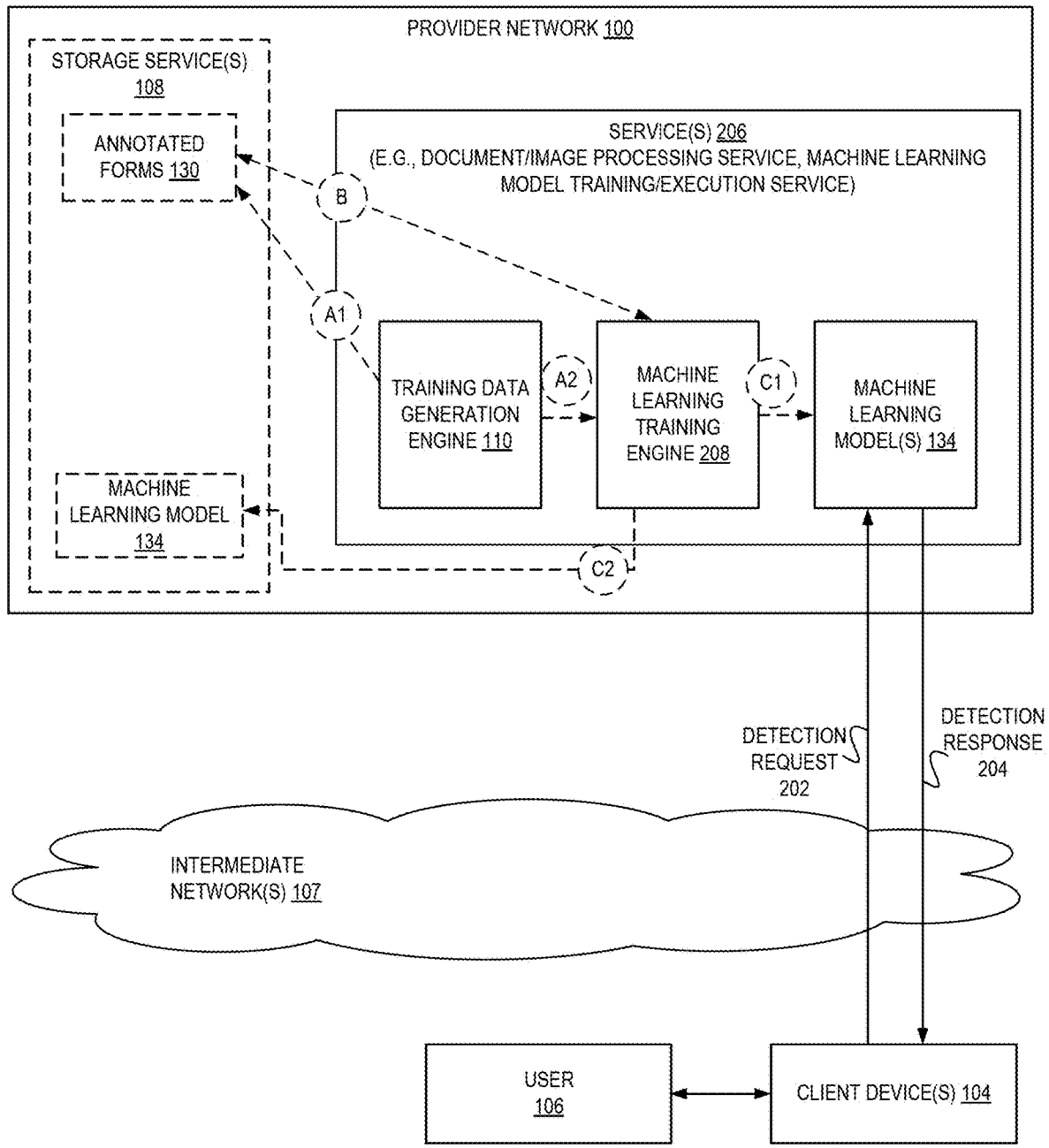
FIG. 2 is a diagram illustrating an environment for utilizing a training data generation engine to generate annotated synthetic form training data for training machine learning models according to some embodiments.

For example, FIG. 2 is a diagram illustrating an environment for utilizing a training data generation engine to generate annotated synthetic form training data for training machine learning models according to some embodiments. In this environment, the training data generation engine 110 is implemented within one of one or more services 206 such as a document or image processing service, a machine learning service, a model training or execution service, etc.

At circle (A1) or (A2), the training data generation engine 110 may store the generated annotated forms 130 at a storage location of storage service(s) 108 or directly provide the generated annotated forms 130 to a machine learning training engine 208, which responsive to a training request (that identifies, e.g., the annotated forms 130 to be used as training data, among other things) can obtain (at circle (B)) and utilize the annotated forms 130 as input training data to train a machine learning model 134, which may be stored at circle (C2) or run at circle (C1) within one of the one or more services 206. For a particular detection request 202 that includes or identifies a new image including a representation of a document/form therein, the machine learning model 134 can run to identify the text and/or locations depicted therein, the key-value associations, etc. which may be returned in a detection response 204 message to the client device(s) 104.

Although these examples regard the creation of synthetic forms or documents, these techniques can straightforwardly be applied in the contexts. For example, embodiments can use the grammar 120 based layout generation techniques to generate different three-dimensional environments such as rooms of a house (having a number of windows, tables, chairs, etc., at locations specified by the rules of the grammar 120, of various styles/shapes, etc.). Similarly, images generated by such a process (e.g., via a rendering engine) would be especially beneficial for training various classes of recognition algorithms.

Figure 3:
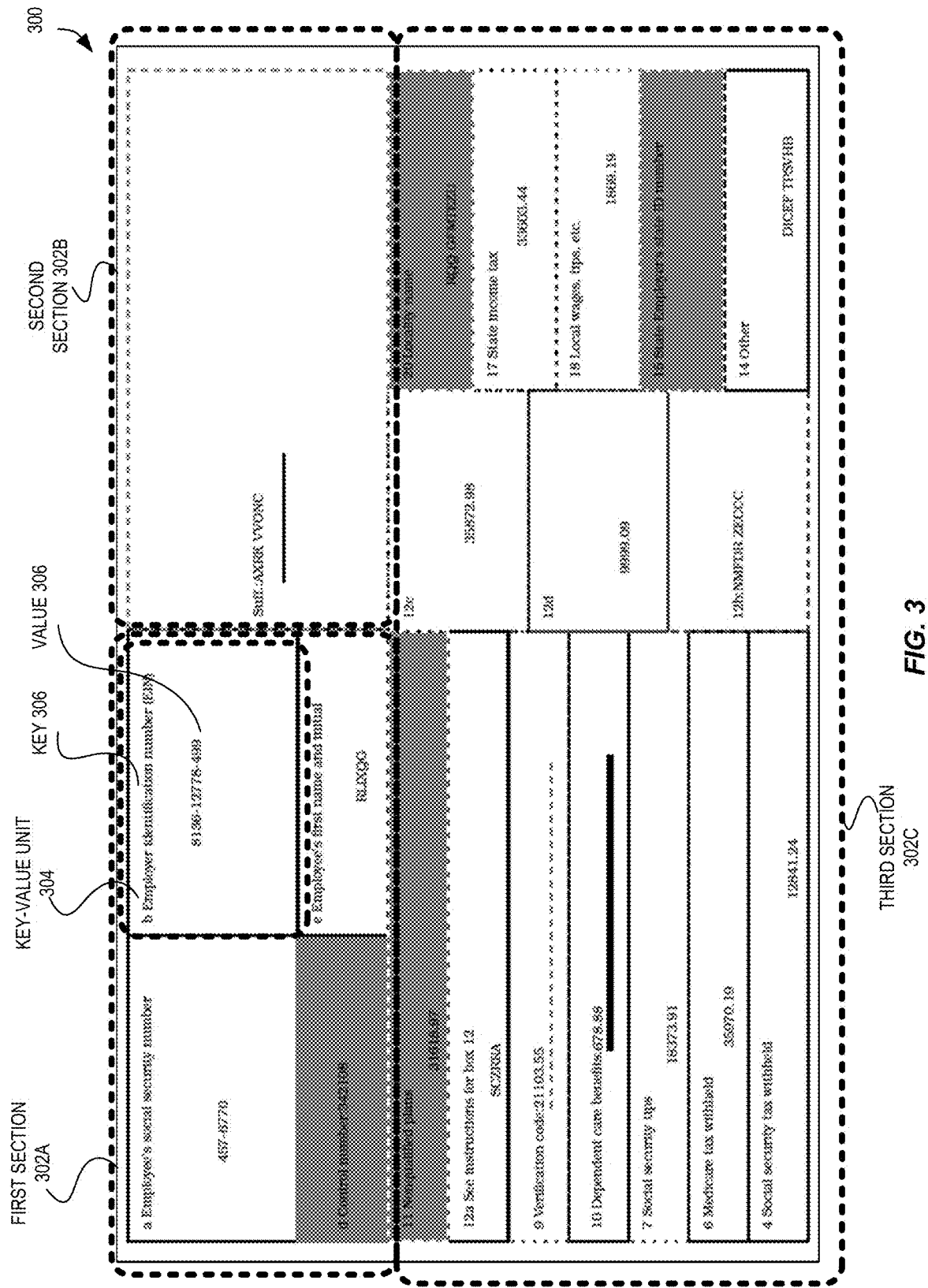
FIG. 3 is a diagram illustrating an exemplary annotated synthetic form according to some embodiments.

For further detail of document sections, key-value units, etc., we turn to FIG. 3, which is a diagram illustrating an exemplary annotated synthetic form 300 according to some embodiments. This synthetic form 300 is shown as including a first section 302A, a second section 302B, and a third section 302C. The first section 302A includes four key-value units—for example, a key-value unit 304 is shown as a large rectangle with a key 306 of "b. Employer identification number (EIN)" and a value 306 of "8136-12778-499." The second section 302B includes a single key-value unit, while the third section 302C includes fifteen key-value units.

FIG. 4 is a diagram illustrating another exemplary annotated synthetic form 400 according to some embodiments. Notably, the various key-value units include different attributes such as line widths, line types, key placement locations, etc. In one portion 402, an expanded "group" (or expansion 404) for "name" is shown as two key-value units.

Figure 5:
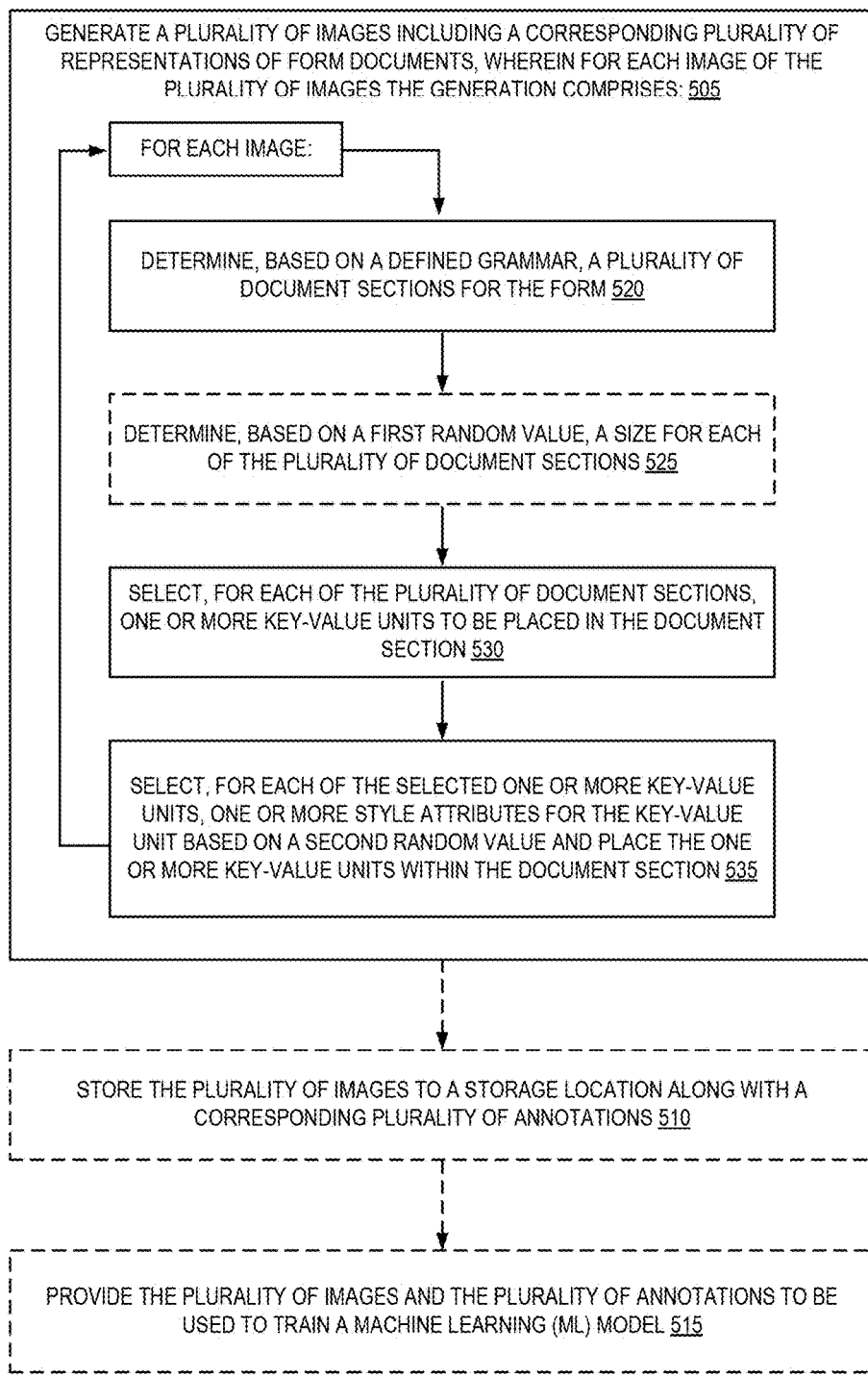
FIG. 5 is a flow diagram illustrating operations of a method for grammar-based automated generation of annotated synthetic form training data according to some embodiments.

FIG. 5 is a flow diagram illustrating operations of a method for grammar-based automated generation of annotated synthetic form training data according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the training data generation engine 110, storage service(s) 108, and/or services 206 of the other figures.

The operations 500 include, at block 505, generating a plurality of images including a corresponding plurality of representations of form documents. Block 505 may be performed by the training data generation engine 110 of the other figures, and include, for each image of the plurality of images, one or more of blocks 520-535. At block 520, determining, based on a defined grammar, a plurality of document sections for the form; optionally at block 525, determining, based on a first random value, a size for each of the plurality of document sections; at block 530, selecting, for each of the plurality of document sections, one or more key-value units to be placed in the document section; and at block 535, selecting, for each of the selected one or more key-value units, one or more style attributes for the key-value unit based on a second random value and placing the one or more key-value units within the document section.

Optionally the operations 500 include, at block 510, storing the plurality of images to a storage location along with a corresponding plurality of annotations (e.g., which may be performed by the training data generation engine 110 by sending the plurality of images and annotations to storage service 108), and at block 515, providing the plurality of images and the plurality of annotations to be used to train a ML model (e.g., which may be performed by the storage service 108 in sending the plurality of images and annotations to a machine learning trading engine).

Figure 6:
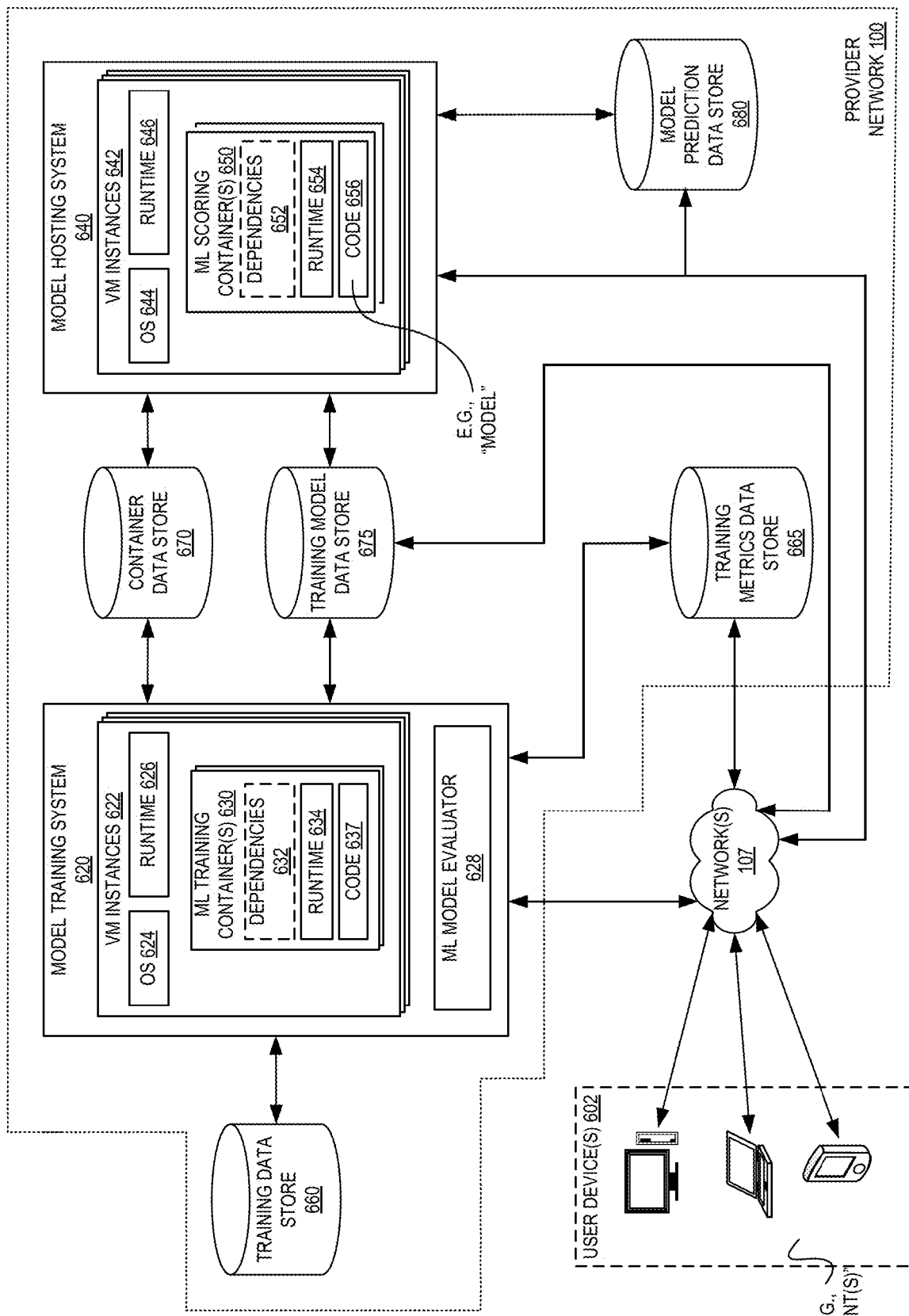
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 602 (e.g., client device(s) 104), a model training system 620, a model hosting system 640, a training data store 660, a training metrics data store 665, a container data store 670, a training model data store 675, and a model prediction data store 680. A machine learning service described herein (e.g., a service 206) may include one or more of these entities, such as the model hosting system 640, model training system 620 (e.g., analogous to the machine learning training engine 208), etc.

In some embodiments, users, by way of user devices 602, interact with the model training system 620 to provide data that causes the model training system 620 to train one or more machine learning models. A machine learning model, generally, may be thought of as one or more equations that are "trained" using a set of data. In some embodiments, the model training system 620 provides ML functionalities as a Web service, and thus messaging between user devices 602 and the model training system 620 (or provider network 100), and/or between components of the model training system 620 (or provider network 100), may utilize HTTP messages to transfer data in a machine-readable file format, such as eXtensible Markup Language (XML) or JavaScript Object Notation (JSON).

The user devices 602 can interact with the model training system 620 via frontend 629 of the model training system 620. For example, a user device 602 can provide a training request to the frontend 629 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 602, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 602 may provide, in the training request, an algorithm written in any programming language. The model training system 620 then packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (e.g., an interactive web-based programming environment) and cause the algorithm/code to be provided—perhaps as part of a training request (or referenced in a training request)—to the model training system 620, where this algorithm/code may be containerized on its own or used together with an existing container having a machine learning framework, for example.

In some embodiments, instead of providing a container image in the training request, the user device 602 provides, in the training request, an indicator of a container image (e.g., an indication of an address or a location at which a container image is stored). For example, the container image can be stored in a container data store 670, and this container image may have been previously created/uploaded by the user. The model training system 620 can retrieve the container image from the indicated location and create a container using the retrieved container image. The container is then loaded into a virtual machine instance 622 for training a machine learning model, as described in greater detail below.

The model training system 620 can use the information provided by the user device 602 to train a machine learning model in one or more pre-established virtual machine instances 622 in some embodiments. In particular, the model training system 620 includes a single physical computing device or multiple physical computing devices that are interconnected using one or more computing networks (not shown), where the physical computing device(s) host one or more virtual machine instances 622. The model training system 620 can handle the acquisition and configuration of compute capacity (e.g., containers, instances, etc., which are described in greater detail below) based on the information describing the computing machine on which to train a machine learning model provided by the user device 602. The model training system 620 can then train machine learning models using the compute capacity, as is described in greater detail below. The model training system 620 can automatically scale up and down based on the volume of training requests received from user devices 602 via frontend 629, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance and can be utilized to isolate execution of a task from other processes (e.g., task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (e.g., creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 637, and dependencies 632 needed by the code 637 in some embodiments. The runtime 634 can be defined by one or more executable instructions that form at least a portion of a container image that is used to form the ML training container 630 (e.g., the executable instruction(s) in the container image that define the operating system and/or runtime to run in the container formed from the container image). The code 637 includes one or more executable instructions that form at least a portion of a container image that is used to form the ML training container 630. For example, the code 637 includes the executable instructions in the container image that represent an algorithm that defines a machine learning model, which may reference (or utilize) code or libraries from dependencies 632. The runtime 634 is configured to execute the code 637 in response to an instruction to begin machine learning model training. Execution of the code 637 results in the generation of model data, as described in greater detail below.

In some embodiments, the code 637 includes executable instructions that represent algorithms that define different machine learning models. For example, the code 637 includes one set of executable instructions that represent a first algorithm that defines a first machine learning model and a second set of executable instructions that represent a second algorithm that defines a second machine learning model. In some embodiments, the virtual machine instance 622 executes the code 637 and trains all of the machine learning models. In some embodiments, the virtual machine instance 622 executes the code 637, selecting one of the machine learning models to train. For example, the virtual machine instance 622 can identify a type of training data indicated by the training request and select a machine learning model to train (e.g., execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 620 uses one or more container images included in a training request (or a container image retrieved from the container data store 670 in response to a received training request) to create and initialize a ML training container 630 in a virtual machine instance 622. For example, the model training system 620 creates a ML training container 630 that includes the container image(s) and/or a top container layer.

Prior to beginning the training process, in some embodiments, the model training system 620 retrieves training data from the location indicated in the training request. For example, the location indicated in the training request can be a location in the training data store 660. Thus, the model training system 620 retrieves the training data from the indicated location in the training data store 660. In some embodiments, the model training system 620 does not retrieve the training data prior to beginning the training process. Rather, the model training system 620 streams the training data from the indicated location during the training process. For example, the model training system 620 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (e.g., a buffer storing the retrieved portion is nearly empty), then the model training system 620 can retrieve a second portion of the training data and provide the second retrieved portion to the virtual machine instance 622, and so on.

To perform the machine learning model training, the virtual machine instance 622 executes code 637 stored in the ML training container 630 in some embodiments. For example, the code 637 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (e.g., coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 620 as input parameters to some or all of the instructions being executed.

In some embodiments, executing the executable instructions causes the virtual machine instance 622 (e.g., the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 620 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 675.

In some embodiments, a virtual machine instance 622 executes code 637 stored in a plurality of ML training containers 630. For example, the algorithm included in the container image can be in a format that allows for the parallelization of the training process. Thus, the model training system 620 can create multiple copies of the container image provided in a training request and cause the virtual machine instance 622 to load each container image copy in a separate ML training container 630. The virtual machine instance 622 can then execute, in parallel, the code 637 stored in the ML training containers 630. The virtual machine instance 622 can further provide configuration information to each ML training container 630 (e.g., information indicating that N ML training containers 630 are collectively training a machine learning model and that a particular ML training container 630 receiving the configuration information is ML training container 630 number X of N), which can be included in the resulting model data. By parallelizing the training process, the model training system 620 can significantly reduce the training time in some embodiments.

In some embodiments, a plurality of virtual machine instances 622 execute code 637 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 620 can create multiple copies of the container image provided in a training request, initialize multiple virtual machine instances 622, and cause each virtual machine instance 622 to load a container image copy in one or more separate ML training containers 630. The virtual machine instances 622 can then each execute the code 637 stored in the ML training containers 630 in parallel. The model training system 620 can further provide configuration information to each ML training container 630 via the virtual machine instances 622 (e.g., information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 620 can significantly reduce the training time in some embodiments.

In some embodiments, the model training system 620 includes a plurality of physical computing devices and two or more of the physical computing devices hosts one or more virtual machine instances 622 that execute the code 637. Thus, the parallelization can occur over different physical computing devices in addition to over different virtual machine instances 622 and/or ML training containers 630.

In some embodiments, the model training system 620 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (e.g., known results), and thus the ML model evaluator 628 can define a machine learning model using the model data and execute the machine learning model by providing the input data as inputs to the machine learning model. The ML model evaluator 628 can then compare the outputs of the machine learning model to the expected outputs and determine one or more quality metrics of the machine learning model being trained based on the comparison (e.g., the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 602, can transmit a request to the model training system 620 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 620 can modify the machine learning model accordingly. For example, the model training system 620 can cause the virtual machine instance 622 to optionally delete an existing ML training container 630, create and initialize a new ML training container 630 using some or all of the information included in the request, and execute the code 637 stored in the new ML training container 630 to restart the machine learning model training process. As another example, the model training system 620 can cause the virtual machine instance 622 to modify the execution of code stored in an existing ML training container 630 according to the data provided in the modification request. In some embodiments, the user, via the user device 602, can transmit a request to the model training system 620 to stop the machine learning model training process. The model training system 620 can then instruct the virtual machine instance 622 to delete the ML training container 630 and/or to delete any model data stored in the training model data store 675.

As described below, in some embodiments, the model data stored in the training model data store 675 is used by the model hosting system 640 to deploy machine learning models. Alternatively or additionally, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (e.g., rapid initialization of machine learning model training in ML training container(s) 630) in response to training requests.

In some embodiments, the model training system 620 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model hosting system 640, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 640 includes a single physical computing device or multiple physical computing devices that are interconnected using one or more computing networks (not shown), where the physical computing device(s) host one or more virtual machine instances 642. The model hosting system 640 can handle the acquisition and configuration of compute capacity (e.g., containers, instances, etc.) based on demand for the execution of trained machine learning models. The model hosting system 640 can then execute machine learning models using the compute capacity, as is described in greater detail below. The model hosting system 640 can automatically scale up and down based on the volume of execution requests received from user devices 602 via frontend 649 of the model hosting system 640, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance and can be utilized to isolate execution of a task from other processes (e.g., task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (e.g., creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (e.g., supporting software such as libraries) needed by the code 656 in some embodiments. The runtime 654 can be defined by one or more executable instructions that form at least a portion of a container image that is used to form the ML scoring container 650 (e.g., the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (e.g., predicted results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 640 uses one or more container images included in a deployment request (or a container image retrieved from the container data store 670 in response to a received deployment request) to create and initialize a ML scoring container 650 in a virtual machine instance 642. For example, the model hosting system 640 creates a ML scoring container 650 that includes the container image(s) and/or a top container layer.

As described above, a user device 602 can submit a deployment request and/or an execution request to the model hosting system 640 via the frontend 649 in some embodiments. A deployment request causes the model hosting system 640 to deploy a trained machine learning model into a virtual machine instance 642. For example, the deployment request can include an identification of an endpoint (e.g., an endpoint name, such as an HTTP endpoint name) and an identification of one or more trained machine learning models (e.g., a location of one or more model data files stored in the training model data store 675). Optionally, the deployment request also includes an identification of one or more container images stored in the container data store 670.

Upon receiving the deployment request, the model hosting system 640 initializes ones or more ML scoring containers 650 in one or more hosted virtual machine instance 642. In embodiments in which the deployment request includes an identification of one or more container images, the model hosting system 640 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 640 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 640 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 640 retrieves the identified model data file from the training model data store 675 and inserts the model data file into a single ML scoring container 650, which forms a portion of code 656. In some embodiments, the model data file is archived or compressed (e.g., formed from a package of individual files). Thus, the model hosting system 640 unarchives or decompresses the model data file to obtain multiple individual files and inserts the individual files into the ML scoring container 650. In some embodiments, the model hosting system 640 stores the model data file in the same location as the location in which the model data file was stored in the ML training container 630 that generated the model data file. For example, the model data file initially was stored in the top container layer of the ML training container 630 at a certain offset, and the model hosting system 640 then stores the model data file in the top container layer of the ML scoring container 650 at the same offset.

In embodiments in which multiple model data files are identified in the deployment request, the model hosting system 640 retrieves the identified model data files from the training model data store 675. The model hosting system 640 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 640 associates the initialized ML scoring container(s) 650 with the endpoint identified in the deployment request. For example, each of the initialized ML scoring container(s) 650 can be associated with a network address. The model hosting system 640 can map the network address(es) to the identified endpoint, and the model hosting system 640 or another system (e.g., a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 640 via the frontend 649, where the execution request identifies an endpoint and includes an input to a machine learning model (e.g., a set of input data). The model hosting system 640 or another system (e.g., a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 640 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (e.g., if no more trained machine learning models are needed to generate an output) or transmit the second output to a third ML scoring container 650 initialized in the same or different virtual machine instance 642 (e.g., if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (e.g., rapid initialization of ML scoring container(s) 650, rapid execution of code 656 in ML scoring container(s), etc.) in response to deployment and/or execution requests.

In some embodiments, the model hosting system 640 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model training system 620, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 620 and the model hosting system 640 depicted in FIG. 6 are not meant to be limiting. For example, the model training system 620 and/or the model hosting system 640 could also operate within a computing environment having a fewer or greater number of devices than are illustrated in FIG. 6. Thus, the depiction of the model training system 620 and/or the model hosting system 640 in FIG. 6 may be taken as illustrative and not limiting to the present disclosure. For example, the model training system 620 and/or the model hosting system 640 or various constituents thereof could implement various Web services components, hosted or "cloud" computing environments, and/or peer-to-peer network configurations to implement at least a portion of the processes described herein. In some embodiments, the model training system 620 and/or the model hosting system 640 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 620. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 640. The frontend 649 processes the requests and makes sure that the requests are properly authorized. For example, the frontend 649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 620 and the model hosting system 640, this is not meant to be limiting. For example, in some embodiments not shown, the training data store 660 is located internal to at least one of the model training system 620 or the model hosting system 640.

In some embodiments, the training metrics data store 665 stores model metrics. While the training metrics data store 665 is depicted as being located external to the model training system 620 and the model hosting system 640, this is not meant to be limiting. For example, in some embodiments not shown, the training metrics data store 665 is located internal to at least one of the model training system 620 or the model hosting system 640.

The container data store 670 stores container images, such as container images used to form ML training containers 630 and/or ML scoring containers 650, that can be retrieved by various virtual machine instances 622 and/or 642. While the container data store 670 is depicted as being located external to the model training system 620 and the model hosting system 640, this is not meant to be limiting. For example, in some embodiments not shown, the container data store 670 is located internal to at least one of the model training system 620 and the model hosting system 640.

The training model data store 675 stores model data files. In some embodiments, some of the model data files are comprised of a single file, while other model data files are packages of multiple individual files. While the training model data store 675 is depicted as being located external to the model training system 620 and the model hosting system 640, this is not meant to be limiting. For example, in some embodiments not shown, the training model data store 675 is located internal to at least one of the model training system 620 or the model hosting system 640.

The model prediction data store 680 stores outputs (e.g., execution results) generated by the ML scoring containers 650 in some embodiments. While the model prediction data store 680 is depicted as being located external to the model training system 620 and the model hosting system 640, this is not meant to be limiting. For example, in some embodiments not shown, the model prediction data store 680 is located internal to at least one of the model training system 620 and the model hosting system 640.

While the model training system 620, the model hosting system 640, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 602 via the one or more network(s) 107.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 620 and/or the model hosting system 640 provides the user devices 602 with one or more user interfaces, command-line interfaces (CLI), application programming interfaces (API), and/or other programmatic interfaces for submitting training requests, deployment requests, and/or execution requests. In some embodiments, the user devices 602 can execute a stand-alone application that interacts with the model training system 620 and/or the model hosting system 640 for submitting training requests, deployment requests, and/or execution requests.

In some embodiments, the network 107 includes any wired network, wireless network, or combination thereof. For example, the network 107 may be a personal area network, local area network, wide area network, over-the-air broadcast network (e.g., for radio or television), cable network, satellite network, cellular telephone network, or combination thereof. As a further example, the network 107 may be a publicly accessible network of linked networks, possibly operated by various distinct parties, such as the Internet. In some embodiments, the network 107 may be a private or semi-private network, such as a corporate or university intranet. The network 107 may include one or more wireless networks, such as a Global System for Mobile Communications (GSM) network, a Code Division Multiple Access (CDMA) network, a Long Term Evolution (LTE) network, or any other type of wireless network. The network 107 can use protocols and components for communicating via the Internet or any of the other aforementioned types of networks. For example, the protocols used by the network 107 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
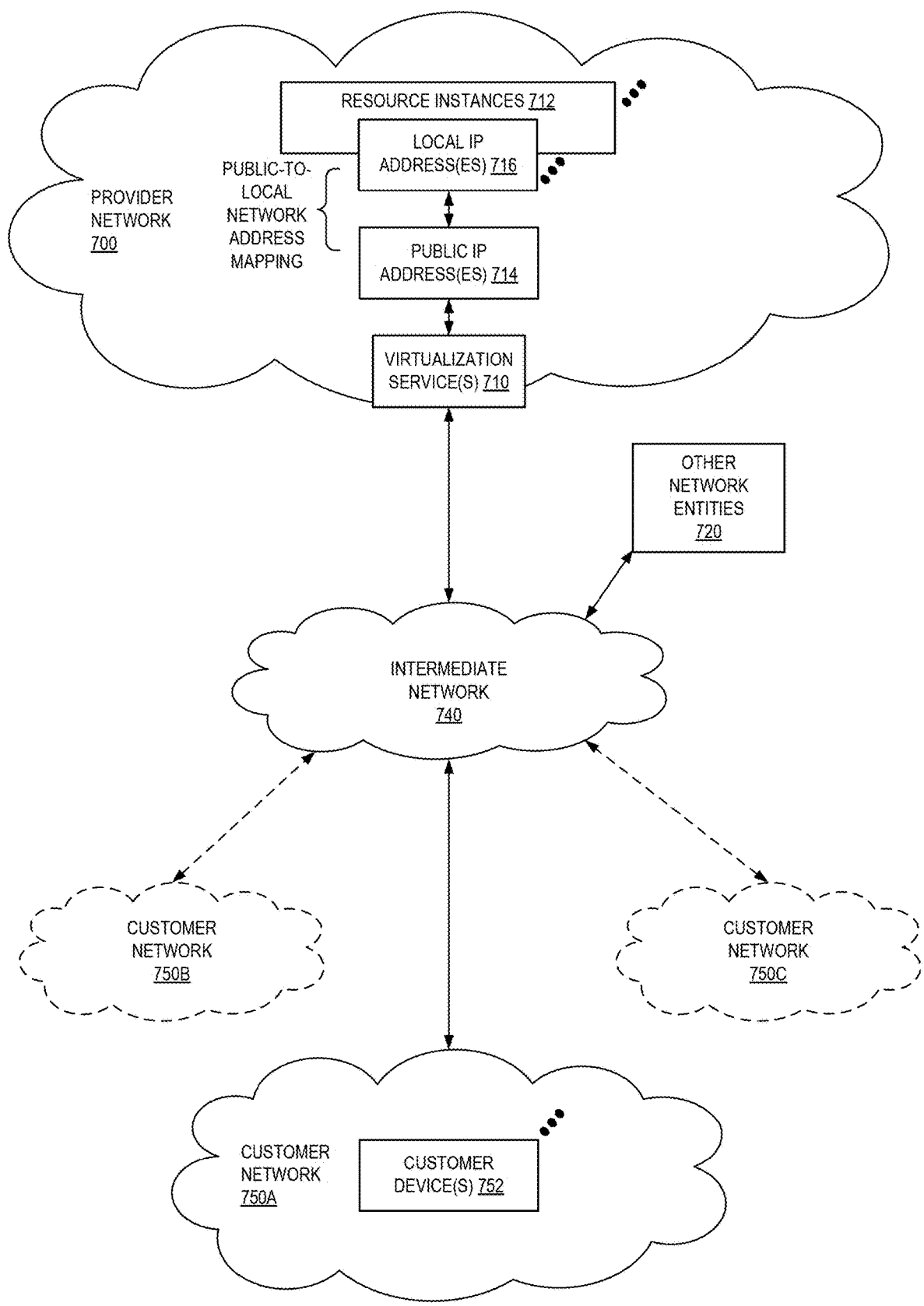
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
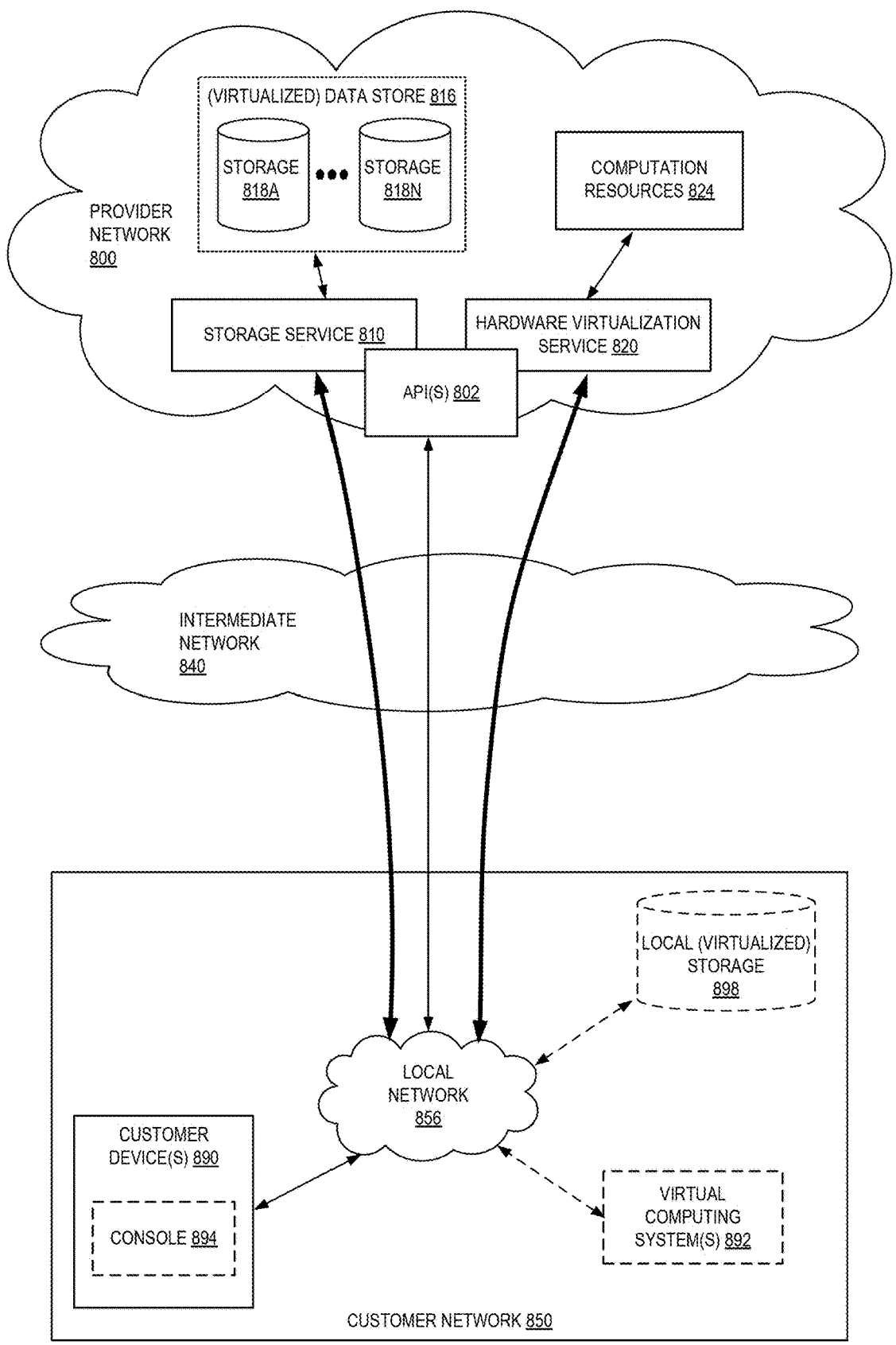
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
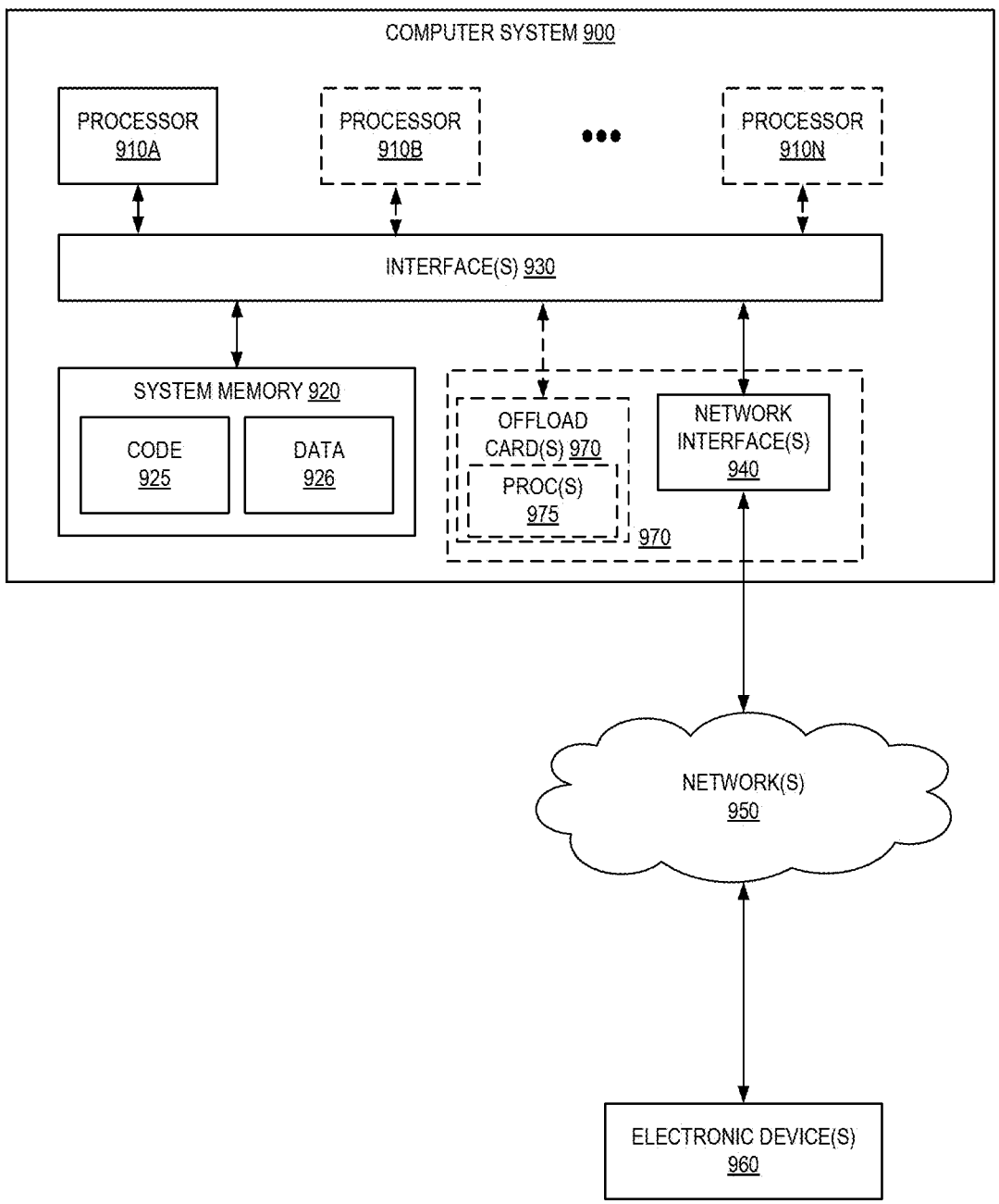
FIG. 9 is a block diagram illustrating an example computer system that may be used in some embodiments.

In some embodiments, a system that implements a portion or all of the techniques for grammar-based automated generation of annotated synthetic form training data for machine learning as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
generating a plurality of images including representations of a corresponding plurality of forms, wherein for each image of the plurality of images the generating comprises:
determining, based on a defined grammar, a plurality of document sections for the form,
selecting, for each of the plurality of document sections based on the defined grammar, one or more key-value units to be placed in the document section,
selecting, for each of the selected one or more key-value units, one or more style attributes for the key-value unit based on a random value, and
placing the one or more key-value units within the document section with the selected style attributes;
storing the plurality of images to a storage location along with a corresponding plurality of annotations; and
providing the plurality of images and the plurality of annotations to be used to train a machine learning (ML) model.

2. The computer-implemented method of claim 1, wherein for each image of the plurality of images the generating further comprises:
generating, for at least one of the one or more key-value units of the image, a value to be placed within the at least one key-value unit;
determining, based on a second random value, a characteristic comprising at least one of a location, a font size, a font, or a font style for the value; and
placing the value within the at least one key-value unit according to the determined characteristic.

3. The computer-implemented method of claim 1, wherein the defined grammar specifies that at least one pair of key-value units that are to be placed adjacent to one another.

4. A computer-implemented method comprising:
generating a plurality of documents, wherein for each document of the plurality of documents the generating comprises:
determining, based on a defined grammar, a plurality of sections for the document,
selecting, for each of the plurality of sections based on the defined grammar, one or more key-value units to be placed in the section, and
selecting, for each of the selected one or more key-value units, one or more style attributes and placing the one or more key-value units within the section; and
storing the plurality of documents to a storage location.

5. The computer-implemented method of claim 4, wherein the plurality of documents includes representations of forms that are stored as image files.

6. The computer-implemented method of claim 5, further comprising:
generating a plurality of annotation data structures corresponding to the plurality of documents, each annotation data structure indicating at least locations of the one or more key-value units within the corresponding document; and
storing the plurality of annotation data structures along with the plurality of documents at the storage location.

7. The computer-implemented method of claim 6, further comprising:
obtaining the plurality of annotation data structures and the plurality of documents from the storage location; and
utilizing the plurality of annotation data structures and the plurality of documents to train a machine learning (ML) model.

8. The computer-implemented method of claim 4, further comprising:
selecting, based on a random value, the defined grammar from a plurality of defined grammars.

9. The computer-implemented method of claim 4, further comprising:
for at least one of the one or more key-value units of a document,
obtaining a key;
determining, based on a randomization, one or more style attributes for the key;
obtaining a value;
determining, based on a randomization, one or more style attributes for the value; and
placing the key and the value within the at least one key-value unit according to the one or more style attributes for the key and according to the one or more style attributes for the value.

10. The computer-implemented method of claim 9, wherein the one or more style attributes for the key include one or more of:
- a stride amount between characters of the key;
- a font size; or
- a font.

11. The computer-implemented method of claim 9, wherein:
- obtaining the key comprises selecting the key from a dictionary of keys; and
- obtaining the value comprises generating the value based on the key.

12. The computer-implemented method of claim 4, wherein:
- the selecting of each of the one or more style attributes for at least one of the key-value units is based on a random value;
- the one or more style attributes for at least one of the key-value units include at least one of:
  - a width of a line;
  - a style of a line;
  - a color of a line;
  - a background fill color;
  - a margin or padding amount;
  - a position of the key; or
  - a position of the value.

13. The computer-implemented method of claim 4, wherein the generating further comprises:
- for one of the plurality of documents, determining the plurality of sections for the document includes identifying a hierarchy of sections, wherein a first section of the hierarchy includes a second section of the hierarchy that is to be placed within the first section.

14. A system comprising:
- a storage service implemented by a first one or more electronic devices; and
- a training data generation engine implemented by a second one or more electronic devices, the training data generation engine including instructions that upon execution cause the training data generation engine to:
  - generate a plurality of documents, wherein for each document of the plurality of documents, the training data generation engine is to:
    - determine, based on a defined grammar, a plurality of sections for the document,
    - select, for each of the plurality of sections, one or more key-value units, and
    - select, for each of the selected one or more key-value units, one or more style attributes and place the one or more key-value units within the section; and
  - store the plurality of documents to a storage location provided by the storage service.

15. The system of claim 14, wherein the plurality of documents includes representations of forms and are stored as image files.

16. The system of claim 15, wherein the training data generation engine is further to:
- generate a plurality of annotation data structures corresponding to the plurality of documents, each annotation data structure indicating at least locations of the one or more key-value units within the document; and
- store the plurality of annotation data structures along with the plurality of documents at the storage location.

17. The system of claim 16, further comprising another service of a same provider network as the training data generation engine and the storage service, the another service including instructions that upon execution cause the another service to:
- obtain the plurality of annotation data structures and the plurality of documents from the storage location; and
- utilize the plurality of annotation data structures and the plurality of documents to train a machine learning (ML) model.

18. The system of claim 14, wherein the training data generation engine is further to:
- select, according to a second random value, the defined grammar from a plurality of defined grammars.

19. The system of claim 14, wherein the training data generation engine is further to:
- for at least one of the one or more key-value units of a document,
  - obtain a key;
  - determine one or more style attributes for the key based on a random value;
  - obtain a value;
  - determine one or more style attributes for the value based on a random value; and
  - place the key and the value within the at least one key-value unit according to the one or more style attributes for the key and according to the one or more style attributes for the value.

20. The system of claim 19, wherein:
- for the at least one key-value unit, the one or more style attributes for the key include one or more of:
  - a stride amount between characters of the key;
  - a font size; or
  - a font; and
- the one or more style attributes for at the least one key-value unit include at least one of:
  - a width of a line;
  - a style of a line;
  - a color of a line;
  - a background fill color;
  - a margin or padding amount;
  - a position of the key; or
  - a position of the value.

* * * * *